June 5, 1934.            P. KEARNY            1,961,589

REDUCING VALVE

Filed Sept. 24, 1931

INVENTOR
Philip Kearny
BY
Knight &
ATTORNEYS

Patented June 5, 1934

1,961,589

UNITED STATES PATENT OFFICE 1,961,589

REDUCING VALVE

Philip Kearny, New York, N. Y.

Application September 24, 1931, Serial No. 564,769
In Canada September 26, 1930

4 Claims. (Cl. 50—35)

This application is a continuation in part of my prior application, filed September 28, 1929, Serial No. 395,778.

In reducing valves now commonly employed, the pressure-regulating action of the valve is usually under the control of a flexible diaphragm which responds to fluctuations of the pressure to be regulated; but owing to the relatively fragile nature of such diaphragms, they are not adapted to withstand high pressures, say five hundred pounds and upwards.

It has also been proposed to make the pressure-responsive member of such a valve in the form of a rigid piston working in or across an opening through the wall of the operating-pressure chamber with a packing to prevent leakage around the piston. Valves of this latter class have thus far been incapable of operating efficiently under high-operating pressures and for a long time, owing to rapid disintegration of the packing.

The object of my invention is to provide a valve of the piston type in which the oscillations of the piston, in response to fluctuations of the operating pressure, subject the packing to the least possible wearing action. This is accomplished, according to my invention, by so disposing the packing in relation to the valve casing and piston, that neither the movements of the piston nor the pressure of the fluid seeking to escape, force the packing against metal parts which would tend to cut into the packing. So far as I am aware, this feature is broadly new.

Looked at broadly, my improved valve comprises a low or operating pressure chamber having an aperture which is closed by a piston connected to the movable member of the valve proper, with a compressible packing member which is in telescoping relation with the piston and pressure chamber casing and which is also confined axially, preferably under considerable pressure, between transverse seats on the piston and casing respectively. Other features of novelty will be pointed out in the following description of a preferred embodiment of the invention.

In the accompanying drawing—

Figure 1:
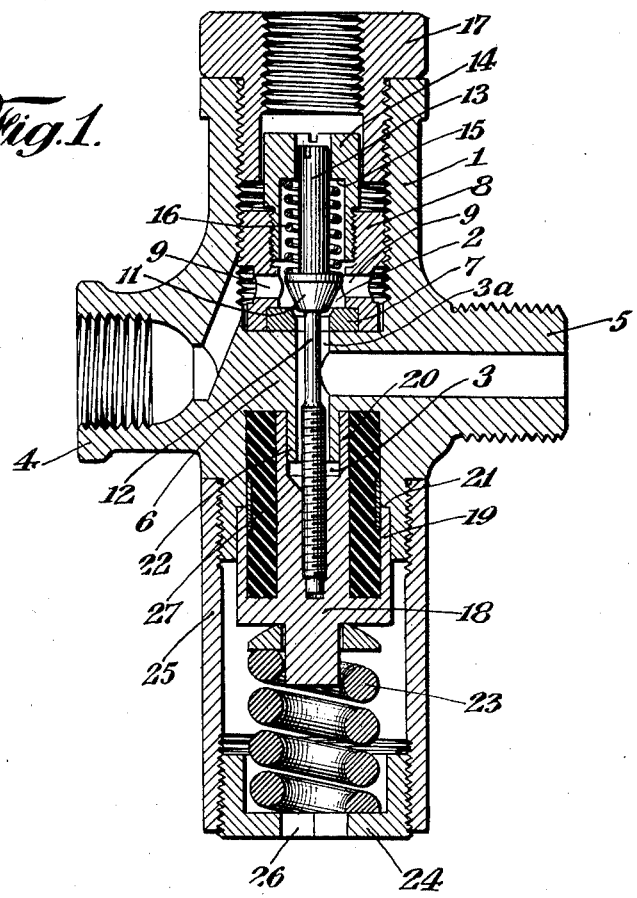
Figure 2:
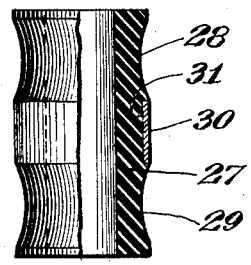

Figure 1 is a longitudinal sectional view of a preferred embodiment of the invention; and Figure 2 is a view in elevation, partly in section, of the packing member shown in Figure 1.

Referring to the drawing in detail, 1 is a valve body or casing having a high pressure chamber 2 and a low pressure chamber 3. Hollow threaded boss 4 provides an inlet port to the high pressure chamber, and is adapted to be connected to a source of fluid under pressure. Another hollow boss 5 communicates with the low pressure chamber and is adapted to be connected with an instrument for utilizing the fluid under pressure.

The valve body is provided with an apertured partition 6, preferably integral with the valve body, which constitutes a support and abutment for several of the parts hereinafter described. On the upper side of the partition, valve seat 7 is clamped against the partition by means of a nut 8, the valve seat resting in shoulders formed on the nut. The lower portion of nut 8 is reduced in diameter, providing an annular chamber which is in communication with inlet 4. Radial bores 9 put the annular chamber last-mentioned in communication with high pressure chamber 2.

Valve 11 is carried by stem 12, which projects downwardly through central aperture 3a, and also has an upward extension 13 which is slotted to receive a screw driver. Nut 14 is in threaded engagement with nut 8, and the former is provided internally with a shoulder 15 which serves as a seat for the upper end of compression spring 16. At its lower end the spring seats against valve 11. An additional nut 17 is threaded for attachment to a pressure indicator or other instrument.

At its lower end the valve stem 12 is externally threaded to engage the head or piston 18, which has an outer flange 19 and an inner flange 20. Flange 19 telescopically engages the casing 1 and seats upon shoulder 21 when valve 11 is in raised position, as shown. Flange 20 telescopically engages hollow extension 22 on partition 6, and seats against the partition when valve 11 is in raised position. Against piston 18 bears a compression spring 23 which is seated at its other end in a recessed nut 24 tapped into hollow extension 25 of the valve body. Nut 24 has a squared aperture 26 to engage a wrench, and this aperture also serves to equalize the pressure in the chamber containing spring 23 with atmospheric pressure, as the piston rises and falls.

Compressible packing member 27 is seated in the annular recess between flange 19 and the substantially continuous surface formed by flange 20 and casing 1. It is also confined endwise between axially opposed seats on the piston and partition 6, respectively. The packing member is preferably made of rubber in the form of an elongated ring, and as shown in Figure 2 its original length is considerably longer than its length when inserted in the valve. To facilitate endwise compression of the ring its thickness is reduced intermediate its ends. In the form shown in Figure 2 this is done at two points, 28 and 29.

Sufficient material should be left, however, to insure that the ring will press closely against its confining walls at every point. A metal ring 30 seats in an annular channel 31 on rubber ring 28 and, when the valve is assembled, ring 30 bridges the gap between flange 19 and shoulder 21.

In assembling the valve, ring 27 may be inserted in the piston and the latter placed in position and forced home by screwing in nut 24 against spring 23. The piston should be forced in until it seats against shoulder 21 and partition 6, in which position ring 27 will have been subjected to considerable endwise compression. Next, seat 7 may be inserted through the top opening of the casing and clamped down by nut 8. Then valve 11 may be inserted and its stem screwed into the piston. The length of stem 12 is calculated so that when the piston is all the way in and stem 12 has been screwed home, valve 11 will be slightly raised from its seat, as shown. Assembly is completed by inserting spring 16 and screwing in nuts 14 and 17.

In general, the operation of the valve is substantially the same as others known in the art. Fluid admitted under pressure through port 4 enters high pressure chamber 2 and passes through the valve into low pressure chamber 3 and thence through port 5 to the point of consumption. The pressure in chamber 3 tends to raise the piston against spring 23 and this movement is assisted by spring 16, and also to some extent by ring 27. The pressure of spring 23 can be adjusted by rotating nut 24, and that of spring 16 by rotating nut 14, so that the valve will close when the pressure in chamber 3 rises above a predetermined value, and will open again when the pressure falls below that value.

The path of potential leakage is as follows:— Upwardly between flange 20 and extension 22, thence around the rim of flange 20, thence around ring 27 in two paths, thence around the rim of flange 19 and out between flange 19 and casing 1. It will be observed that the only points at which ring 27 is in proximity to corners or external angles of metal are adjacent the rims of flanges 19 and 20. At the small gap between flange 20 and shoulder 21, which exists only when valve 11 is partly or wholly closed, the fluid pressure acts upon ring 27 outwardly and tends to force the ring away from rather than against the rim of flange 20. The gap which exists between flange 19 and casing 1, when valve 11 is partly or wholly closed, is bridged by metal ring 30 so that the rubber ring does not come into contact with the external corners of the gap.

I claim:—

1. A reducing valve comprising a pressure chamber having an aperture, a piston closing said aperture, yieldable means urging the piston inwardly against the pressure in said chamber, said piston and chamber having inner telescopically engaged axially overlapping flanges and outer telescopically engaged axially overlapping flanges and having transverse axially opposed seats, and a compressible packing disposed in telescopic relation to said piston and chamber and confined between said seats and between said inner and outer flanges.

2. A reducing valve according to claim 1 in which a rigid bridge member is interposed between the packing and the gap between said outer flanges.

3. A reducing valve according to claim 1 in which a rigid bridge member is interposed between the packing and the gap between said outer flanges, said packing having an annular groove in which said bridge member is seated.

4. A reducing valve comprising a pressure chamber having an aperture, a piston telescopically seated in said aperture, yieldable means urging the piston inwardly against the pressure in said chamber, transverse axially opposed seats on said piston and pressure chamber, a compressible packing disposed in telescopic relation to said piston and chamber and confined between said seats, and a rigid bridge member interposed between the packing and the gap between said chamber and piston.

PHILIP KEARNY.